Patented Oct. 24, 1950

2,526,792

UNITED STATES PATENT OFFICE 2,526,792

PUFFED WAXY CEREAL FOOD AND PROCESS OF MAKING SAME

Mattison Wells Alderman, Battle Creek, Mich., assignor to General Foods Corporation, New York, N. Y., a corporation of Delaware No Drawing. Application September 30, 1946, Serial No. 700,355

9 Claims. (Cl. 99—81)

1

This invention relates to puffed ready-to-eat cereal foods of the breakfast cereal type.

Practically all of the common cereal grains can be puffed successfully by the method known as "gun-puffing" wherein the kernels are subjected to steam under high pressure to convert their moisture content into entrapped steam. The pressure is then released suddenly whereupon the cell walls burst and the kernels expand to as much as eight times their original volume. Gun-puffed cereals of various kinds have been on the market for a long time and are well known. Such products characteristically have substantially smooth outer surfaces and spongy or pithy compressible interiors. As a rule they are not toasted since toasting does not take place during puffing but requires a subsequent treatment.

In distinction to gun-puffing, the method commonly known as "oven-puffing" simply subjects the cooked cereal to relatively high temperatures in the range of 300–600° F. without the application and sudden release of pressure that are characteristic of gun-puffing. Oven-puffing thus produces a product which differs markedly from that obtained with gun-puffing in that it is toasted, frangible and crisp and sufficiently impervious to moisture absorption that when placed in milk or cream it retains its crisp, friable character for a reasonable period. These characteristics of oven-puffed products are very desirable in breakfast cereals, but the general use of this method of puffing has not been practicable heretofore because of the limited amount of puffing produced thereby.

Many expedients have been used in an attempt to overcome the above mentioned disadvantage of oven-puffing. For example, moderate compression or flattening of rice grains between spaced rolls prior to the oven treatment increases the extent of puffing sufficiently to produce an acceptable commercial product. However, this additional and hence undesirable operation does not produce the desired degree of puffing even in the case of rice, and it has little or no effect in the case of other cereals such as corn. Other procedures have been tried without success, such as soaking the grains in a solution of salt with the object of modifying the grain proteins so as to aid subsequent puffing; coating the grains with moisture-impervious materials such as sugar, salt, albumen, or casein with the object of entrapping and retaining their moisture and thereby increasing the degree of puffing; case-hardening the grains with the same object in view; reducing the moisture content of the cooked

2 cereal material to 5–14% just before puffing, together with reducing the grain to a plastic state by shredding or ribboning before such drying; etc. Despite all of these efforts, however, the only oven-puffed breakfast cereal on the market heretofore has been the rice product mentioned above.

One of the objects of the present invention is to provide new ready-to-eat, oven-puffed cereal foods having the toasted brown color, crispness, friability, and temporary imperviousness to moisture in milk or cream which characterize such products and render them highly appetizing.

Another object is to produce such products from cereals other than rice, as well as from rice itself.

A further object is to provide such products having a degree of puff greater than and crispness and friability superior to those obtainable heretofore even in the case of rice.

A still further object is to produce such superior products at minimum cost.

I have discovered that the waxy varieties of the cereal grains, such as corn, rice, sorghum, barley, millet, etc., oven-puff very easily and to a much higher degree of puff than the non-waxy varieties of the corresponding cereals. Thus puffed, toasted, crisp, moisture-impervious products can be produced by oven-puffing cereals which could not be satisfactorily treated by this method heretofore, and even in the case of rice a substantially improved and superior product is obtained. For example, waxy rice puffs two or three times as much as non-waxy rice when processed under identical conditions. Waxy sorghum and waxy corn puff three or more times as much as the non-waxy varieties of these cereals and more than non-waxy rice as heretofore marketed. Similar improvement in the degree of puffing is obtained in the case of waxy barley, etc.

The waxy varieties of the cereal grains are those in which the starch contained in the endosperm is stained red instead of blue with iodine, apparently because the starch has the molecular form known as amylopectin instead of that known as amylose. Other parts of the kernels of these waxy varieties may contain small amounts of non-waxy starch, but even though the whole grain is used so that all of this non-waxy starch is included in the puffed product, its proportion is insufficient to affect the results of the invention.

The whole grain may be processed in the form of whole kernels or fractions thereof such as grits, which are hereinafter referred to together as grain elements, or the whole grain may be ground to flour and made into dough. On the other hand, the grain may be milled to eliminate most of the non-waxy starch which is found principally in a thin layer surrounding the endosperm beneath the bran and in the germ. The milled grain which consists practically entirely of waxy starch may then be processed as grain elements or ground into flour and made into a dough as in the case of the whole grain. Also purified starch obtained from the waxy cereals according to any known method of starch manufacture can be made into a dough and processed in essentially the same manner as dough made from flour. The expression "waxy cereal starch material" as used in the appended claims means any of the several types of starting materials mentioned above which consist predominantly of the waxy cereal starch in all cases, but may include small amounts of non-waxy starch, protein, etc.

The processing of the waxy material consists essentially of cooking and oven-puffing and may be carried out according to known practices of the art. Usually, grain elements are cooked in an autoclave or retort of the revolving type with added flavoring materials such as sugar, malt, salt, etc., whereas doughs are cooked in apparatus having special mixing means which provide sufficient heat transfer to permit the starch in the bulky mass of dough to be gelatinized. Cooking generally requires from 1½ to 2 hours when conducted at a temperature corresponding to 15 lbs. steam pressure, but in any case is continued until the starch is substantially gelatinized, and in the case of grain elements until the desired degree of caramelization and attendant color development has been effected.

The cooking period may be shortened by increasing the temperature or pressure, or by the addition of small amounts of ingredients such as citric acid, phosphoric acid, acid salts, and the like which alter the pH of the cook or otherwise accelerate the gelatinization of the starch or the caramelization. Moreover, it is usually desirable in the case of grain elements to cause them to imbibe water before cooking by pre-soaking them, preferably under pressure, in water which may contain such flavoring materials or accelerating agents as those aforementioned. These measures may be regulated so that if it is desired to maintain the grain elements in their integral form, cooking need not be so prolonged as to cause disintegration. After cooking, the moisture content in the case of grain elements is generally in the range of 30–40%, and the moisture content in the case of doughs is generally between 40 and 80%.

Cooked grain elements should be dried partially before puffing, either in the puffing apparatus or separately before being introduced therein, to a moisture content in the range of 5 to 25% and preferably between 7 and 15%. Also it is usually desirable to compress or otherwise form the grain elements, either before or after such partial drying, so as to facilitate puffing. For example, the elements may merely be flattened by passage through rolls or they may be shredded or extruded. Similarly cooked doughs should preferably be formed by shredding or extrusion into small pieces having at least one cross-sectional dimension that is sufficiently small to permit good heat transfer. However, partial drying of the dough pieces before puffing has less effect than in the case of grain elements and usually is not worthwhile.

Oven-puffing may be carried out in an inclined rotating perforated drum heated by an open flame or by hot gases and provided with internal ribs or fins which lift the material as the drum revolves and shower it through the heated atmosphere within the drum. Generally the temperature of the drum should be maintained within a range of 300–600° F. and it may be regulated so as to be substantially constant throughout the length of the drum or higher or lower at the inlet or outlet end of the drum as desired. The time required for the material to travel the length of the drum or in other words the period provided for puffing and toasting should be of the order of ½ to 3 minutes. It is desirable to effect the puffing and toasting simultaneously and if the time needed for puffing should be insufficient for toasting, additional saccharides can be used to facilitate caramelization. Other types of ovens such as the conduction type may also be used with a somewhat higher temperature range and a longer period for puffing and toasting.

The invention is illustrated by the following examples:

Example 1

35 lbs. of pearled waxy Cody sorghum, 10.1 lbs. of flavoring syrup, and 18.9 lbs. of water were cooked for 2 hours at 15 lbs. steam pressure, after which the cooked material was air-dried to 20% moisture and then tempered for a period of 20 hours. The tempered kernels were then passed through flaking rolls and oven-puffed at a temperature of 350–400° F. for about one minute by passage through a revolving drum. A puffed product of the desired degree of brown color, crispness and imperviousness to moisture was obtained, the puffed flakes having 6 to 12 times their original volume.

Example 2

Pearled waxy sorghum was ground into a flour capable of passing through an 80 mesh screen, and 15 lbs. of this flour were made into a dough with 13.75 lbs. of water containing 1.75 lbs. of sugar and 0.30 lb. of salt. This dough was transferred to a jacketed cooker equipped with suitable mixing means adapted for use in cooking doughs, and cooked for 30 minutes at the temperature corresponding to 20 lbs. steam pressure in the jacket. The cooked dough was extruded to ribbons of ⅜" x ⅛" and the ribbons were cut into pieces about ½" long which were oven-puffed at 550° F. for 5 minutes in a conductance oven. The resulting product comprised toasted, crisp pieces puffed to 3–4 times their original volume and having the desired degree of imperviousness to moisture in milk and cream.

Example 3

6 lbs. of waxy sorghum grain, 3.3 lbs. water, 0.7 lbs. sugar and 0.15 lb. of salt were cooked for 35 minutes in a pressure cooker at 25 lbs. steam pressure. The cooked grain was dried to about 7% moisture, ground to pass through 80 mesh and made into a dough of 40% moisture by admixing 6 lbs. of said flour with 3.5 lbs. of water. The dough was extruded, cut into dough pieces and oven-puffed as in Example 2 and a similar product was obtained.

Example 4

15 lbs. of pearled waxy maize, 1.8 lbs. of sugar, 0.43 lb. of salt and 8.45 lbs. of water were cooked for 2 hours at 15 lbs. steam pressure, after which the cooked material was air-dried to 18% moisture and then tempered for 20 hours. The tempered kernels were then passed through flaking rolls and oven-puffed at a temperature of 350–400° F. for about one minute by passage through a toasting oven (perforated cylinder). A puffed product of the desired degree of brown color, crispness and imperviousness to moisture was obtained, the flakes having puffed two to three times as much as flakes made from non-waxy corn or maize and processed under identical conditions.

Example 5

15 lbs. of California waxy rice, 1.31 lbs. of sugar, 0.44 lb. of salt and 5 lbs. of water were cooked for 1⅔ hours at 15 lbs. steam pressure, after which the cooked material was dried to 18–20% moisture and tempered for 20 hours. The tempered kernels were then passed through flaking rolls and oven-puffed at a temperature of 350–400° F. for about one minute by passage through a toasting oven (perforated cylinder). A puffed product of the desired degree of brown color, crispness and imperviousness to moisture was obtained, the flakes having puffed two to three times as much as flakes made from non-waxy varieties of rice and processed under identical conditions.

Example 6

Pearled waxy barley was cooked with water, sugar and salt for 1½ hours at 13 lbs. steam pressure in an autoclave. The cooked material contained about 35% moisture and was dried to 19.4% moisture and tempered for 12 hours. The tempered kernels were then passed through flaking rolls and oven-puffed under conditions similar to those set forth in the preceding examples. A puffed product of the desired color and crispness was obtained, the flakes having puffed approximately twice as much as flakes made from non-waxy barley and processed under the same conditions.

Example 7

5.8 lbs. of purified waxy sorghum starch were mixed with 3.5 lbs. of water, 0.7 lbs. of sugar and 0.15 lb. of starch, and the mix was then cooked in a jacketed dough mixer for 20 minutes at the temperature corresponding to 20 lbs. steam pressure in the jacket. The cooked material was extruded in shreds which were allowed to dry at room temperature to eliminate surface stickiness. The shreds (about 30% moisture) were then cut into pieces about ½" long which were oven-puffed at 550° F. for 5 minutes in a conductance oven. The resulting product comprised toasted, crisp pieces puffed to approximately 5 times their original volume and more than twice as much as similar pieces made from non-waxy starch and processed under the same conditions.

As noted above the use of whole grain results in the presence of small amounts of non-waxy starch in the product. It will also be understood that commercial crops even when grown from 100% waxy seed may nevertheless include some non-waxy grains due to cross pollination or other causes. Care in the supervision of growing conditions and in the selection of crops will keep the resultant proportion of non-waxy starch so low that it does not substantially affect the results of the invention when the product is made from a flour or dough. However, when the mixed grain is processed as grain elements, some of the puffed pieces in the final product may come entirely from non-waxy kernels. Such pieces will not puff to the same extent as those derived from waxy kernels and hence they may be removed by screening if their number should be excessive.

The invention is not restricted to the examples set forth above and it will be evident to those skilled in the art that various changes can be made in the details of procedure without departing from its spirit. Reference should therefore be had to the appended claims for a definition of the limits of the invention.

What is claimed is:

1. A process for preparing a puffed cereal food product which comprises the steps of cooking waxy cereal starch material and oven-puffing the cooked material.

2. A process for preparing a puffed cereal food product which comprises the steps of cooking a waxy cereal starch material and subjecting small masses of the cooked material to an elevated temperature in the range of 300° F. to 600° F. at atmospheric pressure to toast and puff the product.

3. A process for preparing a puffed cereal food product which comprises the steps of cooking a waxy sorghum starch material and oven-puffing the cooked material.

4. A process for preparing a puffed cereal food product which comprises the steps of cooking a waxy maize starch material and oven-puffing the cooked material.

5. A process for preparing a puffed cereal food product which comprises the steps of cooking a waxy rice starch material and oven-puffing the cooked material.

6. A cereal food product comprising crisp, friable, toasted and puffed particles of cooked waxy cereal starch material.

7. A cereal food product comprising crisp, friable, toasted and puffed particles of cooked waxy sorghum starch material.

8. A cereal food product comprising crisp, friable, toasted and puffed particles of cooked waxy maize starch material.

9. A cereal food product comprising crisp, friable, toasted and puffed particles of cooked waxy rice starch material.

MATTISON WELLS ALDERMAN.

REFERENCES CITED

The following references are of record in the file of this patent:

UNITED STATES PATENTS

| Number | Name | Date |
|---|---|---|
| 1,211,462 | Lorenzen | Jan. 9, 1917 |
| 1,275,711 | Lorenzen | Aug. 13, 1918 |
| 1,832,813 | Luke | Nov. 17, 1931 |

FOREIGN PATENTS

| Number | Country | Date |
|---|---|---|
| 18,946 | Great Britain | of 1912 |

OTHER REFERENCES

"Starch Experiments with 'Waxy Maize,'" Confectioners Journal, June 1943, p. 20.

Weatherwax, Genetics 7, "A Rare Carbohydrate in Waxy Maize," April 1922, pp. 568 to 572.

Caldwell, The Manufacturing Confectioner, "Amioca, a New Industrial Starch," Dec. 1943, pp. 15, 17 and 18.

Schopmeyer et al., Industrial and Engineering Chemistry, "Waxy Cornstarch as a Replacement for Tapioca," Nov. 1943, pages 1168 to 1172.